United States Patent [19]

Makipaa

[11] Patent Number: 5,489,213

[45] Date of Patent: Feb. 6, 1996

[54] METHOD OF AND SYSTEM FOR EMPLOYEE BUSINESS CONDUCT GUIDELINES EDUCATION

[76] Inventor: Juha Makipaa, 5 Charlotte Rd., Fishkill, N.Y. 12524

[21] Appl. No.: 206,621

[22] Filed: Mar. 7, 1994

[51] Int. Cl.$^6$ .................................................. G06F 15/38
[52] U.S. Cl. ........................... 434/322; 434/236; 364/401
[58] Field of Search ................................... 434/107, 212, 434/322, 236–238; 364/401

[56] References Cited

U.S. PATENT DOCUMENTS 5,084,819  1/1992  Dewey et al. ..................... 434/212 X

*Primary Examiner*—Richard J. Apley
*Assistant Examiner*—Glenn E. Richman
*Attorney, Agent, or Firm*—Ilya Zborovsky

[57] ABSTRACT

For improving corporate employee business conduct guidelines education, a system and a method are provided in accordance with which the employee reviews the basic concepts stored in storing means and related to business conduct guidelines, then the employee is quizzed on the basic concepts by displaying a quiz on the computer display; in the event if including the employee's scored satisfactory score for presenting on the computer display, cases of real life application of the basic concepts, in the event if the employee does not score a predetermined score providing at least one remedial education loop on the basic concept, quizzing the employee on each case study by a quiz presented on the computer screen, in the if the employee does not score a satisfactory score on the quiz providing a remedial education loop for the case study, and in the event if the employee scores the satisfactory score on the case study printing a certificate of completion of a business conduct guidelines education.

1 Claim, 3 Drawing Sheets

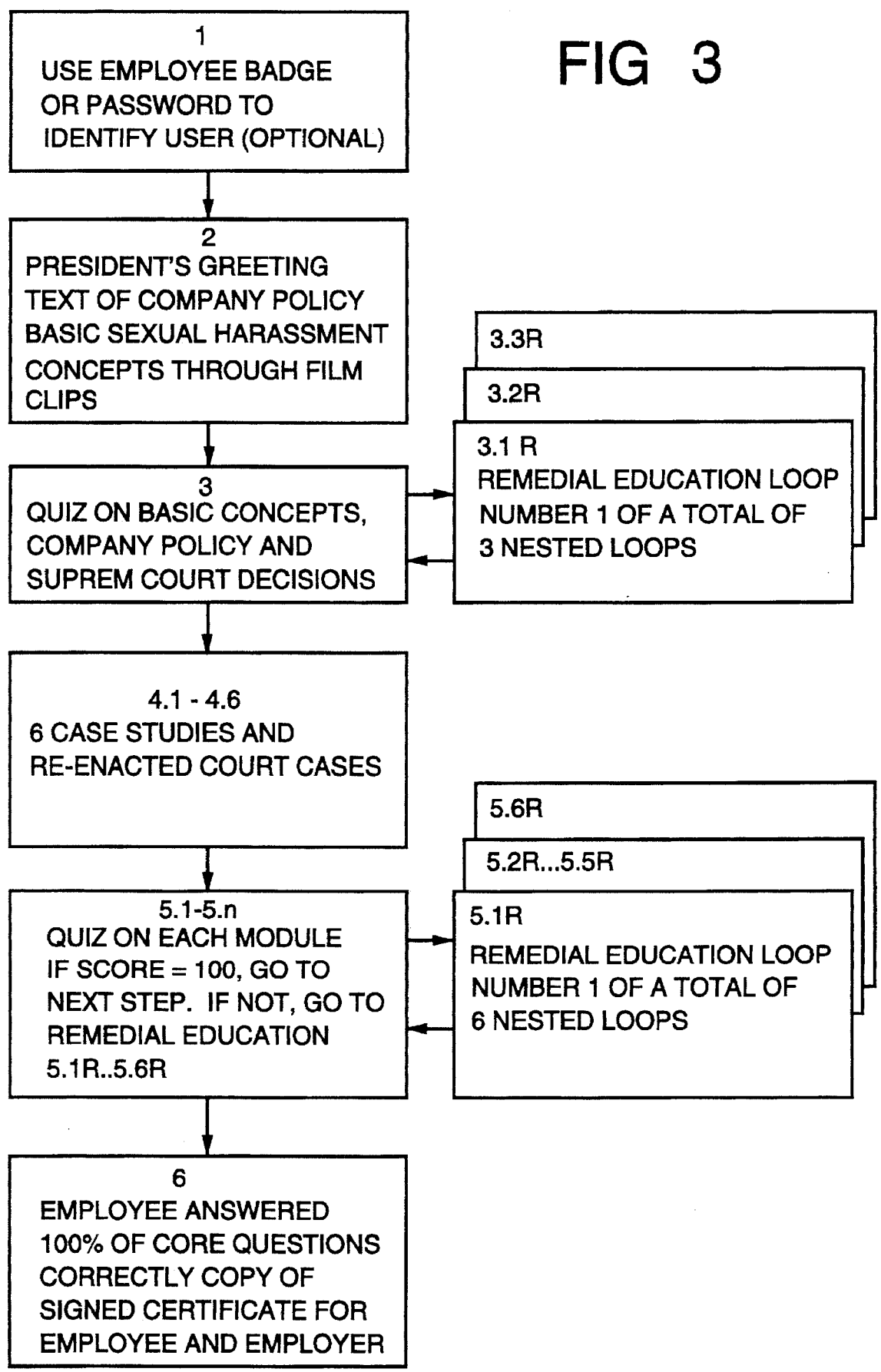

METHOD OF AND SYSTEM FOR EMPLOYEE BUSINESS CONDUCT GUIDELINES EDUCATION

BACKGROUND OF THE INVENTION

The present invention relates to a method of and system for employee business conduct guidelines education.

It is well known that a company which operates in the United States is subject to a wide range of federal, state and local laws governing the ethical conduct of the company and its employees in the marketplace. These laws and regulations include but are not limited to major areas such as: discrimination, sexual harassment, antitrust legislation, insider trading, substance abuse, environmental protection, marketing in the public sector, theft of company assets, etc.

In addition, many companies in their ethics codes bar behavior which is necessarily illegal but is counter-productive or otherwise damaging to the company. When employees violate these laws, regulations and rules, the process of investigating, litigating and initiating corrective actions can be very disruptive on company operations. In the case of litigation, legal fees, plus settlement or actual punitive damages can also become exceedingly expensive.

Many companies are finding that educating their managers and employees on all of the rules and regulations governing ethical conduct in the workplace is a major investment of manpower and time. Yet even the best traditional education is not 100% effective in ensuring that every manager and employee understands what is expected of them. In landmark decisions at state and federal levels, courts have found that company policies and codes of conduct have either not been explicit enough, or individuals have not all received adequate and recent education to help them understand the details of the applicable laws and regulations.

SUMMARY OF THE INVENTION

Accordingly, it is an object of the present invention to provide a method of and a system for business conduct guidelines education, which ensures a high quality education in specific areas and at the same time generates documentation which shows that each individual has fully understood the concept and the rules covered by the education given.

It is another object of the present invention to provide a system which implements the inventive method and allows each user to learn at his or her place at a time which best fits the individual's work schedule.

It is still a further object of the invention to provide a method and a system in accordance with which an employee is provided with documentation of each education session, and the results of the session can be used in defending the company in the case of litigation resulting from an employee violating law and the company policy.

In keeping with these objects and with others which will become apparent hereinafter, one feature of the present invention resides, briefly stated, in a method of business conduct guidelines education, comprising the steps of reviewing by an employee on a display of a computer basic concepts stored in storing means and related to business conduct guidelines, quizzing the employee on the basic concepts by displaying a quiz on the computer display, in the event if including the employee's scored satisfactory score for presenting on the computer display, cases of real life application of said basic concepts, in the event if the employee does not score a predetermined score providing at least one remedial education loop on said basic concept, quizzing the employee on each case study by a quiz presented on the computer screen, in the if the employee does not score a satisfactory score on the quiz providing a remedial education loop for the case study, and in the event if the employee scores the satisfactory score on the case study printing a certificate of completion of a business conduct guidelines education.

It is another feature of the present invention to provide a system for business conduct guidelines education, including a computer having a display, means for reviewing basic concepts by an employee on a display of a computer basic concepts stored in storing means and related to business conduct guidelines, quizzing the employee on the basic concepts by displaying a quiz on the computer display, in the event if including the employee's scored satisfactory score for presenting on the computer display, cases of real life application of said basic concepts, in the event if the employee does not score a predetermined score providing at least one remedial education loop on said basic concept, quizzing the employee on each case study by a quiz presented on the computer screen, in the if the employee does not score a satisfactory score on the quiz providing a remedial education loop for the case study; and in the event if the employee scores the satisfactory score on the case study printing a certificate of completion of a business conduct guidelines education; and printing means for printing said certificate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing an example of the course of FIG. 2 adapted to a typical business ethics education program.

DESCRIPTION OF THE PREFERRED EMBODIMENTS

Figure 1:
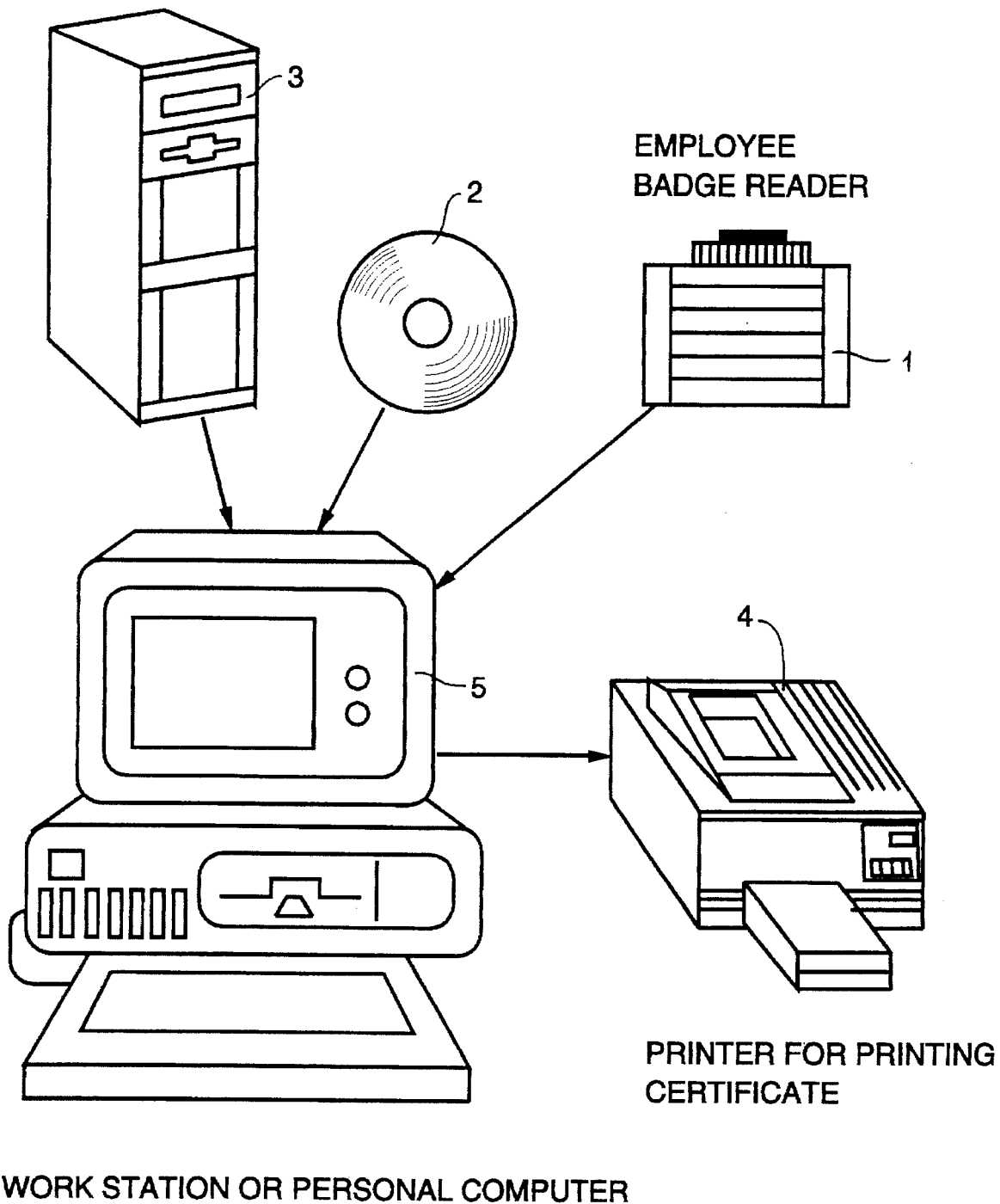
FIG. 1 is a view schematically showing hardware components of a system for a business conduct guidelines education in accordance with the present invention.

A system in accordance with the present invention includes a badge reader identified with reference numeral 1 and enabling a user to identify himself to the system as an employee of a company. A compact disc 2 and a file server 3 are examples of storage devices where film clips and sound files used in an education program may reside. A printer 4 is used for printing a certificate showing that the employee has taken the course and answered correctly all key questions contained in the course. Either a personal computer 5 or a work station with a keyboard is used by the employee to interact with the program and contents of the teaching software.

Figure 2:
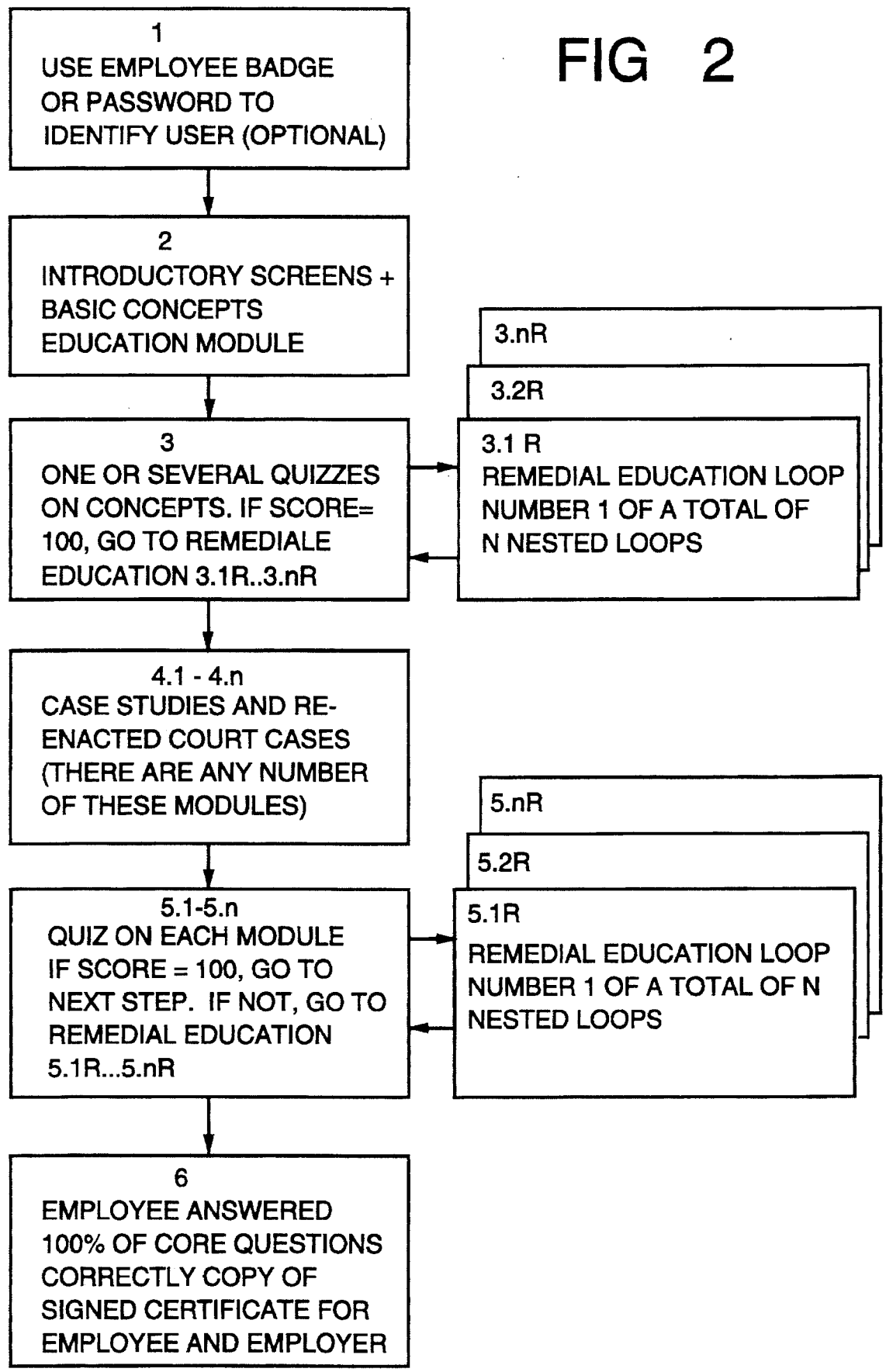
FIG. 2 is a view schematically showing a main concept and key logical components of an interactive multimedia company employee business conduct course in accordance with the present invention.

As can be seen from FIG. 2, in a box 1 which is optional, the employee first identifies himself or herself to the system by using the employee badge reader 1. Then in the box 2 the employee is presented with a tutorial consisting of a combination of charts, graphics and film clips to illustrate the basic legal and management concepts relating to the subject matter at hand. This is the introductory screens and basic concepts education module. In the box 3 the employee then is tested on his or her understanding of the basic concepts through one or several quizzes. If the employee scores 100, the program takes him or her to box 4.1–4.n. If however any questions are answered incorrectly, the program branches out to box 3.1R, 3.2R, 3.3R . . . 3.nR, etc., containing loops of remedial education on the topics which were not internalized by the employee when going through the education presented in box 2. The program will keep branching to the remedial educational loops until all core questions in the quizzes are answered correctly.

Box 4.1 . . . 4.n contains a series of case studies on film clips or charts illustrating the real life application of the basic concepts previously outlined. Each case study is followed by a quiz (5.1–5.n) in the box. If required, remedial education follows as in box 3. When the employee has answered all core questions related to the case studies correctly, the program advances to box 6 where the employee is certified as having successfully completed the course. A certificate is printed on the printer 4, and one signed copy of the certificate goes to the employee, and another goes to the employer.

FIG. 3 illustrates an education program embodied in a course on sexual harassment. In box 1 the employee identifies himself to the system by using his badge and/or a password. In box 2 the president of the company welcomes him to the class and outlines the basic company policies prohibiting sexual harassment. Also, in box 2 the employee uses a series of charts and film clips which illustrate the Supreme Court decisions and the actual cases which now form the foundation for sexual harassment legislation and rules. In box 3 quizzes on each concept are presented, whereby the employee is tested on his understanding of the concepts and company policy. In the case of any incorrect answer to the questions, a nesting of 3 (3.1–3.3) remedial education modules help the employee to better understand the key concepts and to correct any incorrect answers to the core questions.

In box 4.1–4.6, the program presents film clips which illustrate actual fictitious case studies showing the application of the basic concepts previously covered in real life situations in the workplace. Each case study is followed by a quiz (5.1–5.6) containing core questions which must be answered correctly. In the case of incorrect answers, there are again remedial instruction modules 5.1R–5.6R to assist the employee in arriving at the correct answers to the core questions. In box 6 the employee, having answered all core questions correctly, receives a course completion certificate with a copy signed by the employee filed in personnel files.

It will be understood that each of the elements described above, or two or more together, may also find a useful application in other types of methods and constructions differing from the types described above.

While the invention has been illustrated and described as embodied in a method of and system for employee business conduct guidelines education, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of business conduct guidelines education, comprising the steps or identifying an employee by an identifier selected from the group consisting of an employee badge and a password; reviewing basic concepts stored in storing means and related to business conduct guidelines by the employee on a display of a computer; quizing the employee on said basic concepts by displaying on the computer display a quiz on the basic ooncepts; in the event if the employee does not score a predetermined score, providing at least one remedial education loop for the basic concepts by providing a plurality of nested loops for the basic concepts; in the event if the employee scores satisfactory score on the basic concepts, quizzing the employee on each case study by dispaying on the computer display a further quiz on the case study; in the event if the employee does not score a satisfactory score on the further quiz, providing a remedial education loop for the case study by providing a plurality of nested loops for the case study; and in the event if the employee scores the satisfactory score on the case study, printing a certificate of completion of a business conduct guidelines education so as to thereby provide testing of employee's knowledge of the business conduct guidelines and a certification of the employee's business conduct guidelines education completion.

* * * * *